United States Patent [19]
Kho

[11] Patent Number: 6,041,351
[45] Date of Patent: Mar. 21, 2000

[54] NETWORK TRAFFIC BY INSTRUCTION PACKET SIZE REDUCTION

[75] Inventor: Samuel P. Kho, Sunnyvale, Calif.

[73] Assignee: Newmoon.Com, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,919

[22] Filed: Apr. 17, 1997

[51] Int. Cl.$^7$ ........................................ G06F 13/00
[52] U.S. Cl. .................. 709/224; 709/229; 709/219; 709/232
[58] Field of Search ...................... 395/456, 463, 395/425, 453, 200.62, 200.59, 200.54, 200.49; 709/224, 229, 219, 232; 711/126, 129, 133, 136

[56] References Cited

U.S. PATENT DOCUMENTS

| | | | |
|---|---|---|---|
| 4,750,137 | 6/1988 | Harper et al. ............................ | 364/514 |
| 5,086,402 | 2/1992 | Sterling, II .......................... | 395/200.76 |
| 5,381,539 | 1/1995 | Yanai et al. .............................. | 395/425 |
| 5,706,467 | 1/1998 | Vishlitzky et al. ...................... | 395/456 |
| 5,737,536 | 4/1998 | Herrmann et al. ................. | 395/200.59 |
| 5,740,370 | 4/1998 | Battersby et al. ................. | 395/200.49 |
| 5,745,728 | 4/1998 | Genduso et al. ....................... | 395/453 |
| 5,751,993 | 5/1998 | Ofek et al. .............................. | 395/463 |

*Primary Examiner*—Zarni Maung
*Assistant Examiner*—Philip B. Tran
*Attorney, Agent, or Firm*—Fernandez & Associates LLP

[57] ABSTRACT

Network congestion is mitigated through instruction size reduction. Server instruction to client is stored in most-recently-used cache, such that subsequent retransmission attempt of such instruction is detected, avoided, and instead executed locally from cache. Storage performance is tuned optimally to achieve partial avoidance effect according to graphical or text types, and dynamically adaptable as instruction characteristic changes. MRU FIFO cache provides processors with local checking of new instructions in process for network transmission against most recently executed instructions, thereby avoiding repeat transmissions of instructions already accessible locally. More than one instruction set or packet may also be evaluated, stored and monitored similarly, but instruction subsets may be executed selectively. Each processor maintains same cache information synchronously.

14 Claims, 8 Drawing Sheets

NETWORK TRAFFIC BY INSTRUCTION PACKET SIZE REDUCTION

BACKGROUND OF THE INVENTION

1. Field of the Invention

The invention relates to digital computer networks and data communications, particularly to techniques for reducing packet traffic between interconnected processors.

2. Description of Background Art

As computers are increasingly interconnected in various local and wide area networks, data traffic through the networks has increased correspondingly. Traffic congestion is becoming a more burdensome and noticeable problem on data communications infrastructure, particularly during peak usage times when more and larger data files are often loaded on available channels.

Conventional approaches for reducing data traffic aim primarily at increasing performance and capability of network and communications equipment. Such approaches are helpful but tend to be quite expensive to implement. There is a need, therefore, to provide cost-effective technique for reducing network traffic.

SUMMARY OF THE INVENTION

The invention resides in an electronic network which interconnects processors wherein data traffic is reduced effectively by modifying inter-processor instruction size. Data packets or certain instructions transferred between processors in the network are monitored and representatively stored in most-recently-used (MRU) cache memory, such that subsequent retransmission of one or more instructions representing repeat packets are detected as duplicative.

In accordance with an important aspect of the present invention, repeat instruction packets or instruction sets are not retransmitted over network channels, since repeat instructions, which are determined to have been recently executed, are already made available in local processor memory. Instead, such repeat instructions are merely executed directly from local cache memory, without loading limited network channel resources and cycle time. Preferably, a relatively shorter reference instruction packet is sent in lieu of the full repeat instruction. Furthermore, storage cache performance is tunable according to instruction type, such as polygons or text, and dynamically adaptable over time as instruction stream character is observed or predicted to change. Processors preferably maintain same cache information synchronously.

DETAILED DESCRIPTION OF THE PREFERRED EMBODIMENT

The embodiment described herein is preferably implemented in software, although equivalent functionality may be constructed as well in whole or in part in hardware or other specialized digital processing equipment or firmware provided in a single computing unit or distributed across an interconnected network of multiple conventional computers. Each computer includes or has access to conventional processing, storage, user-interface, and network interface facilities. Conventional networked processing units arranged in typical client-server or masterslave fashion and operable for digital packet transfer therebetween are illustrated respectively in simplified block diagram and flow chart form in FIGS. 1 and 2.

Figure 1:
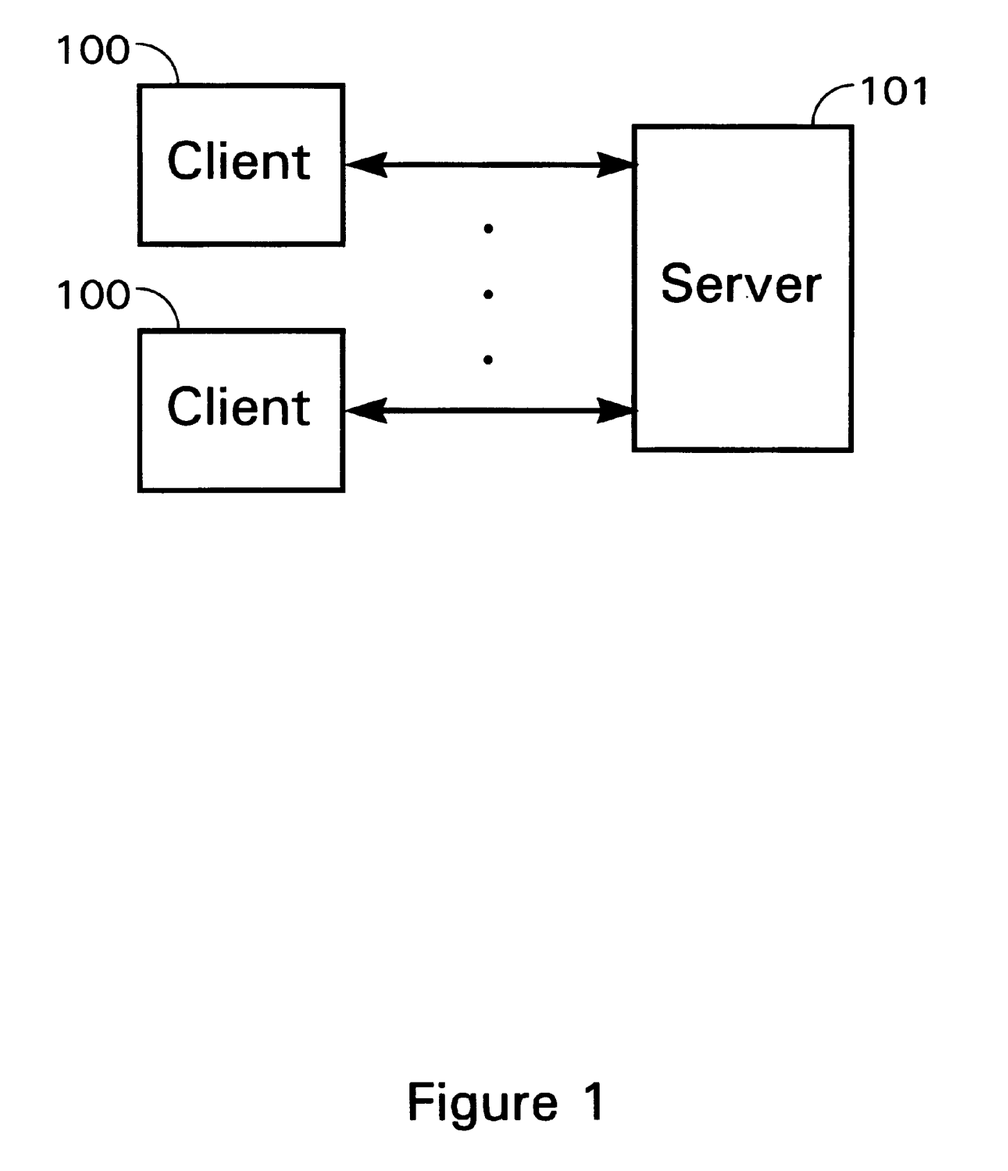
FIG. 1 is a simplified block diagram of a networked system architecture including multiple processors interconnected in a conventional client-server configuration.

As shown, one or more clients 100 couple for data communication across local or wide area networks with server 101, wherein one or more instruction packets are sent by client 100 to server 100, although it is contemplated expansively herein that the inventive techniques for network traffic mitigation are functionally bidirectional such that server-to-client packet transfers are processed to achieve improved traffic reduction using equivalent methodologies.

Figure 2:
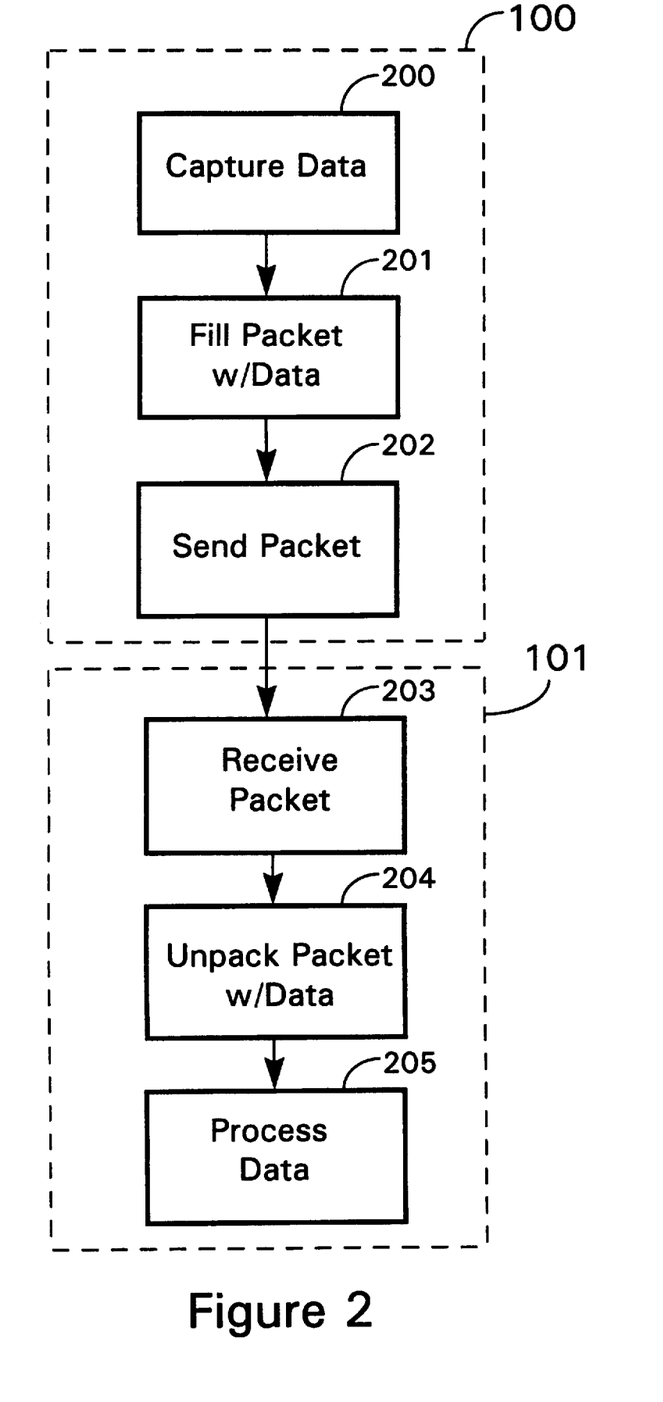
FIG. 2 is a top-level flow chart showing data communication steps for conventional packet transfer between server and client processors.

Hence, when operating conventionally, coupled network processors exchange data between client 100 and server 101 as follows. Initially, certain portion of digital data stream including one or more instructions at source processor (client computer 100) designated for sending to destination processor is captured 200 for transmission packaging into packet. Packet is filled 201 with data, and then sent 202 across interconnecting and routing infrastructure between source and destination. Destination processor (server computer 101) receives 203 packet, which is unpacked 204 to obtain payload data for subsequent processing 205.

In accordance with an important aspect of the present invention, data traffic from communication of packet instructions between computers interconnected in an electronic network is reduced by modifying size of inter-processor instruction sets. Data packets or certain instructions transferred between processors in the network are monitored and thereby reduced effectively in transmitted size. More particularly, actual reduction in loading of network resources and bandwith is accomplished by representatively storing instructions locally in most-recently-used (MRU) cache memory or equivalent associative storage, such that subsequent transmission of instruction sets or abbreviated instructions representing stored packets are detected as duplicative, thereby avoiding repeat transmission of recently-received data which is already stored locally.

Thus, redundant transmission of repeat instruction packet or instruction sets over limited network channels is minimized or avoided altogether. Repeat instructions, which are determined to have been executed recently, already are made available in local and/or other processor memories. Both server and client machines coupled in related networks preferably maintain same recently-used cache information synchronously. Synchronous maintenance is achieved by each processor creating own local MRU cache and updating such cache during each packet transfer. Such repeat instructions are thereby executed directly from local cache memory, without sending full-size, essentially unaltered packets and using additional routing cycle time. Instead, significantly shorter instructions which serve as reference indicator therefor are transmitted in lieu of full instruction stream.

Instructions transmitted herein may contain unformatted digital data or be formatted according to conventional communication standards, applications or any variations thereof for abstracting or packing digital content (e.g., OSI (Open System Interconnection) layers such as application, transport, etc.). At higher levels of formatting abstraction, data may contain more redundant formatting information, which may improve detectability of repeat instructions when evaluated according to the present inventive techniques. For example, packet instructions or data stream as transmitted herein may be formatted according to application layer language or protocol, such as Remote Procedure Calls (RPC), Common Object Request Broker Architecture (CORBA), Distributed Compound/Common Object Model (DCOM), JAVA Remote Method Invocation (RMI), etc.

Furthermore, storage cache performance may be tunable to optimize packet processing efficiency according to instruction type or content, such as polygons, text, graphical instructions, etc. Additionally, such tuning may be dynamically adaptable over time as instruction stream character is observed or predicted to change, preferably according to user-specified thresholds of acceptability and/or instruction type.

Figure 3A:
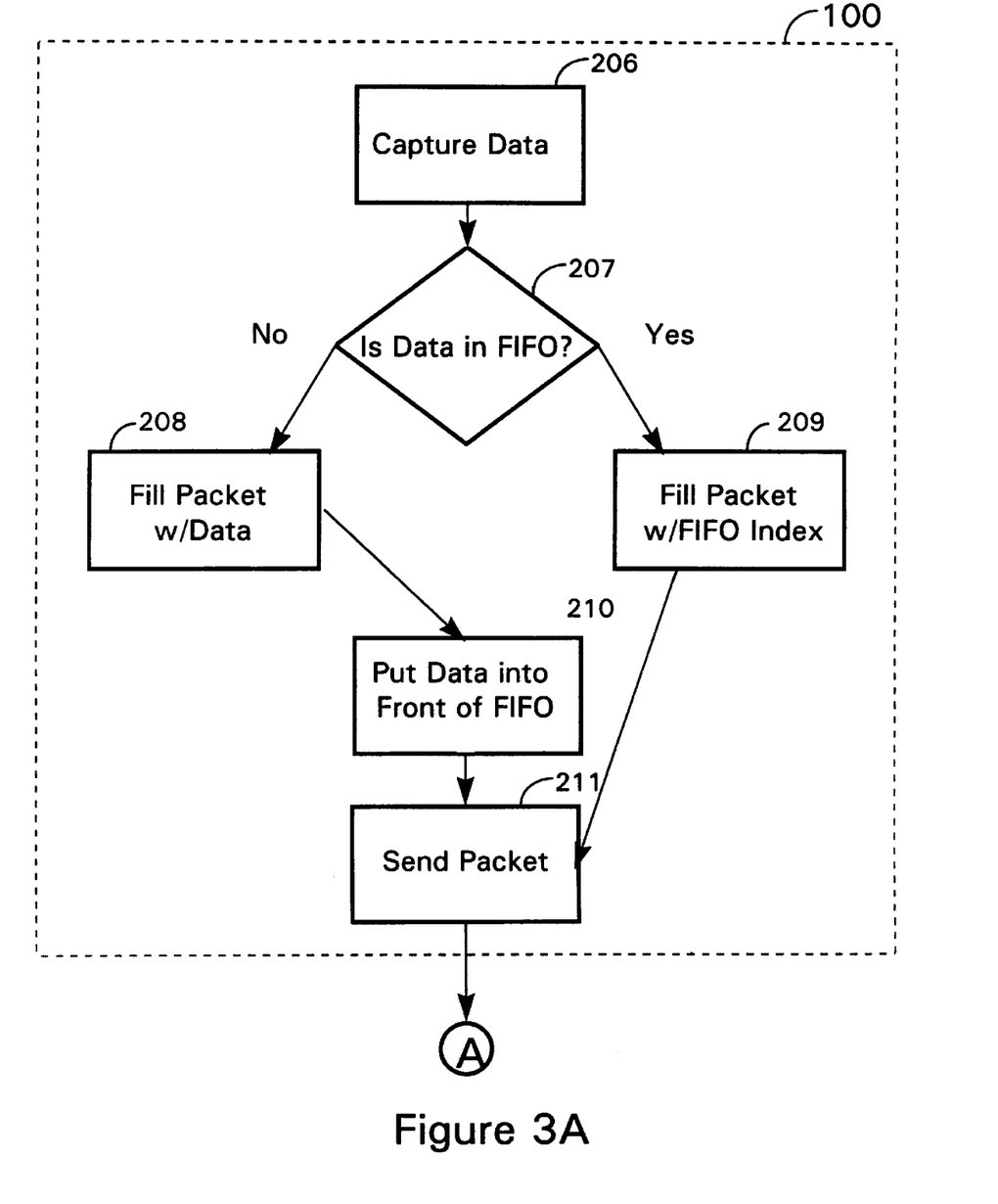
FIGS. 3A–B are related flow charts of functional steps for performing traffic reduction according to the present invention.
Figure 3B:
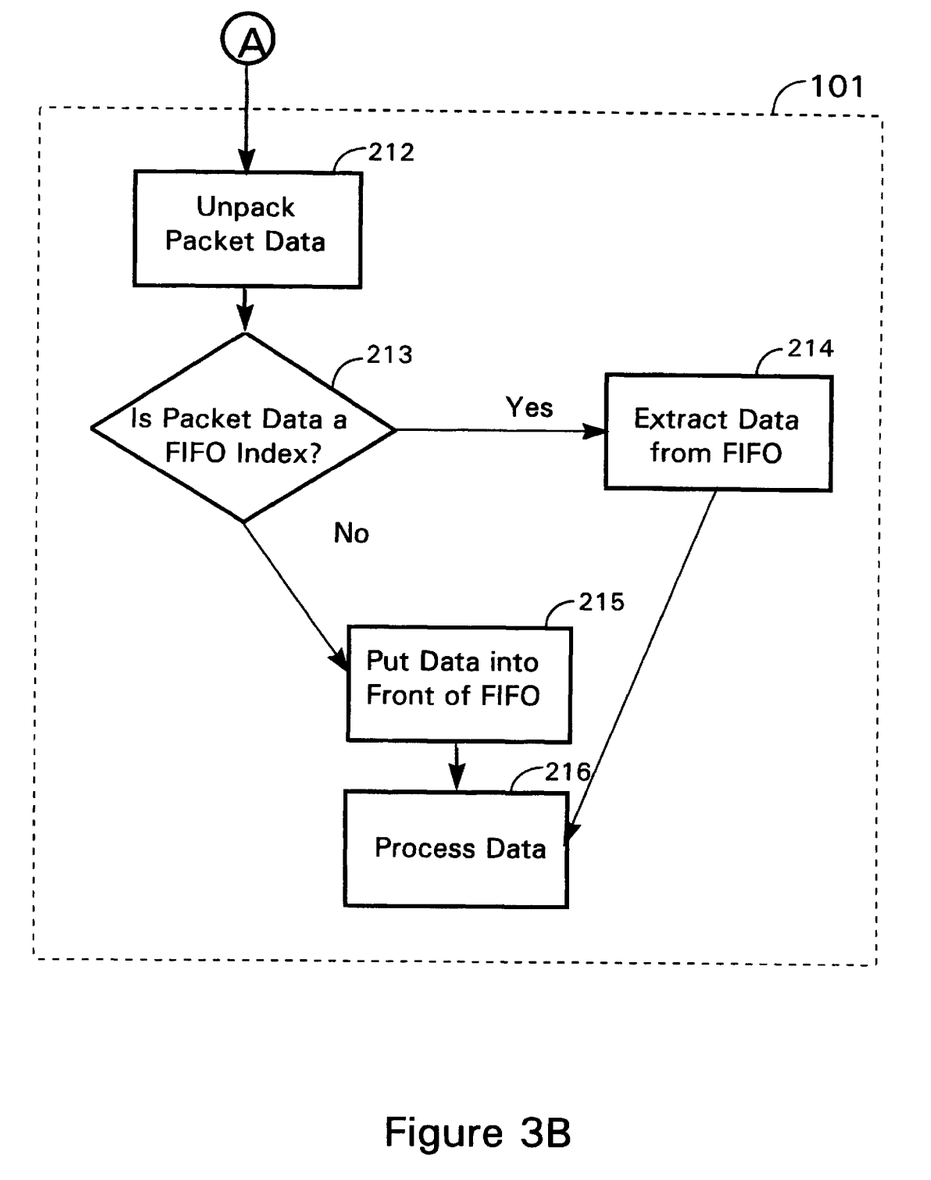

A preferred embodiment shown in related flow charts of FIGS. 3A–B, which respectively include packet processing of data sent by client processor 100 (FIG. 3A) to server processor 101 (FIG. 3B), although equivalent functionality may be implemented bi-directionally by such processors in reverse server-client packet transmission direction.

Initally, in FIG. 3A, data is captured 206 for processing by processor 100 to be sent as one or more instruction packets to processor 101. Preferably, software or firmware in processor 100 compares captured data against any other data in storage to determine whether such data is already available. In accordance with an important aspect of the present invention, cache storage is provided in networked processors wherein recently processed instructions for network transfer are stored or referenced in First-In/First-Out (FIFO) or equivalent associative data structure within locally accessible high-speed memory. FIFO storage is locally synchronous such that each client and server processor maintains or stores in corresponding memories the same information about recently transmitted or received instruction packets.

Optionally single, non-synchronous FIFO storage containing recently-used instructions per processor is accessed centrally by processors, for example, in a networked computer configuration having inter-processor data communication which is relatively slower than processor-FIFO data transfer link.

If processor 100 decides NO in step 207, that captured data is not in FIFO, then a new packet is filled 208 by processor 100 with captured data for network transfer. And such data is put 210 into front section of FIFO. Otherwise, if processor 100 decides YES in step 207, that captured data is in FIFO, then processor 100 generates a short identifier or FIFO index which is filled 209 into packet for transmission; this path provides improved performance for packet processing. Packet processing performance is improved by flushing from FIFO non-relevant data before relevant data; note that steps 209, 210 are accordingly related. Then, filled packet is sent 211 by processor 100 to processor 101 over network [A].

In related FIG. 3B, transmitted packet is received from network [A], and unpacked 212 by processor 101 to obtain data content. Preferably, software or firmware in processor 101 determines 213 whether unpacked packet data is a FIFO index by checking typed. If processor 101 decides NO in step 213, that packet data is not a FIFO index, then such data is put 215 into front of FIFO. Otherwise, if processor 101 decides YES in step 213, that packet data is a FIFO index, then desired data is extracted 214 from FIFO correspondingly according to the index. Packet processing performance is improved by flushing from FIFO non-relevant data before relevant data; note that steps 214, 215 are accordingly related. Then, data is processed 216 by processor 101.

To illustrate the foregoing steps, a representative packet for handle-to-device-context (hdc) instruction follows:

| Instruction format: | TextOut (hdc, x, y, string, length); |
|---|---|
| Sample instruction: | TextOut (0xABCDABCD, 10, 10, "Hello", 5); |
| Packet: (4 bytes) | TextOut Command |
| (4 bytes) | 0xABCDABCD |
| (4 bytes) | 10 |
| (4 bytes) | 10 |
| (6 bytes) | "Hello" |
| (4 bytes) | 5 |

The above sample packet is composed of 26 bytes. Referring to FIG. 3A, during initial processing of this instruction, packet is filled 208 with 26 bytes of data, which is put 210 into front of FIFO. But during subsequent processing, it should be determined 207 that data is in FIFO, and packet is filled 209 with FIFO index, which in this example is the number 5. Hence, packet sent 211 during subsequent processing is shorter (8 bytes total) as follows:

| Packet: (4 bytes) | Use FIFO command |
|---|---|
| (4 bytes) | 5 |

Referring to FIG. 3B, during initial processing of the 26-byte packet, processor 101 determines in step 213 that packet data is not a FIFO index, and data is put 215 into front of FIFO, and then to step 216. However, during subsequent processing of the 8-byte packet, step 213 FIFO index determination causes extraction 214 of entire 26-byte packet from FIFO according to the index #5, such that processor 101 processes 216 the entire packet.

Figure 3C:
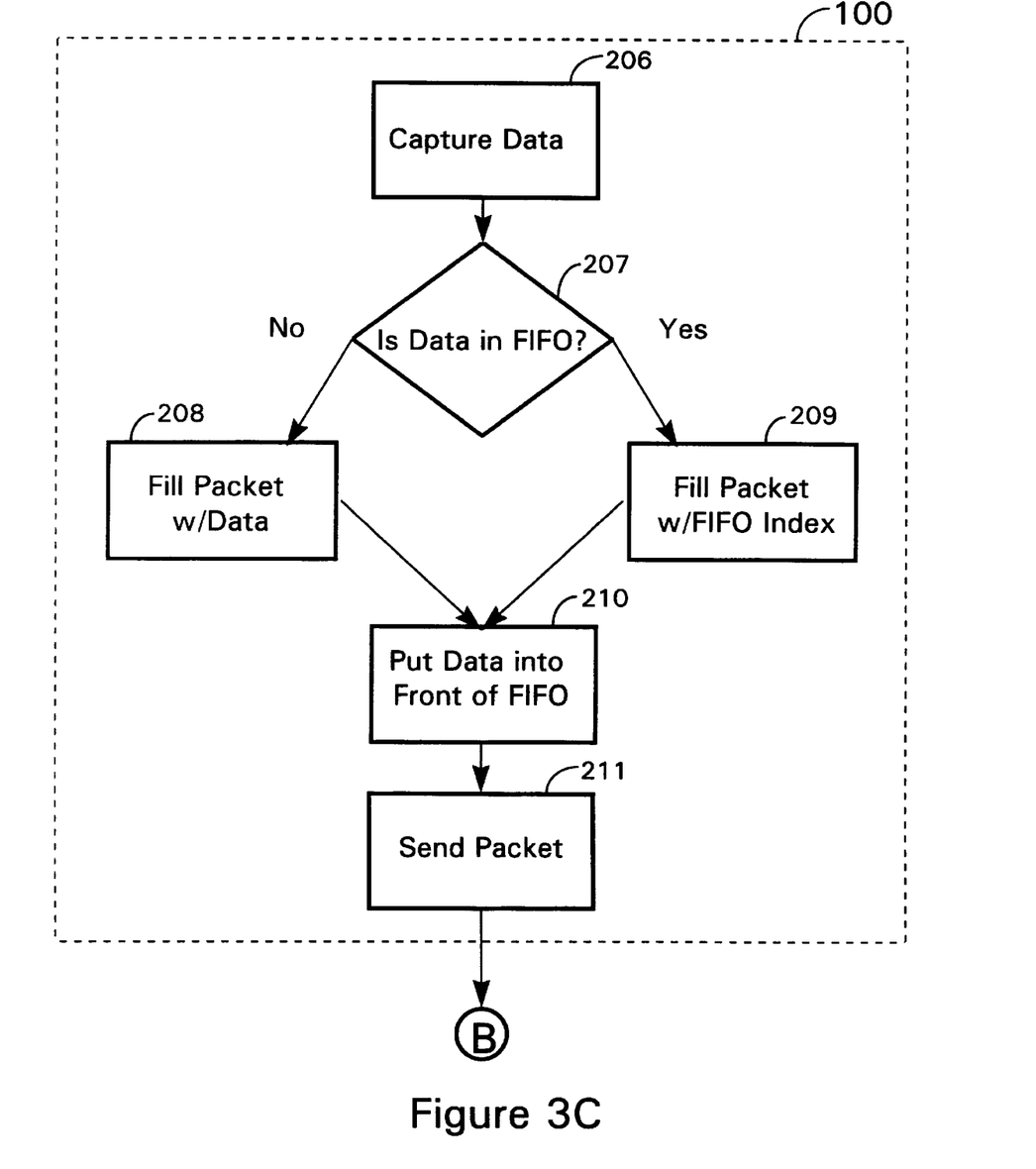
FIGS. 3C–D are related flow charts of functional steps for performing traffic reduction according to an alternate embodiment of the present invention.
Figure 3D:
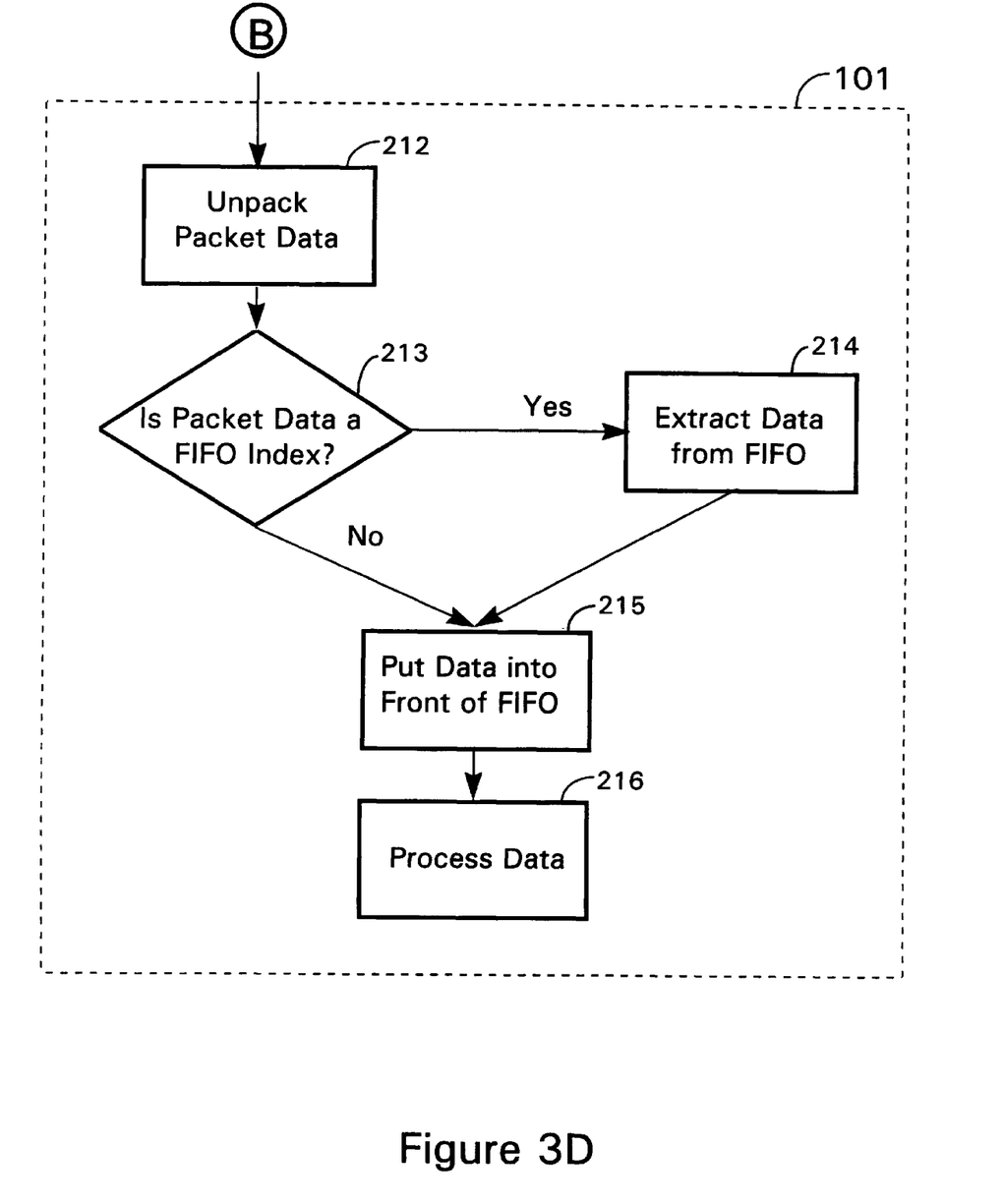

FIGS. 3C–D are related flow charts of functional steps for performing traffic reduction according to an alternate embodiment of the present invention. As shown, this alternate implementation is equivalent to the methodology of FIGS. 3A–B, except that step 210 is performed after step 209, and step 215 is performed after step 214.

Figure 4A:
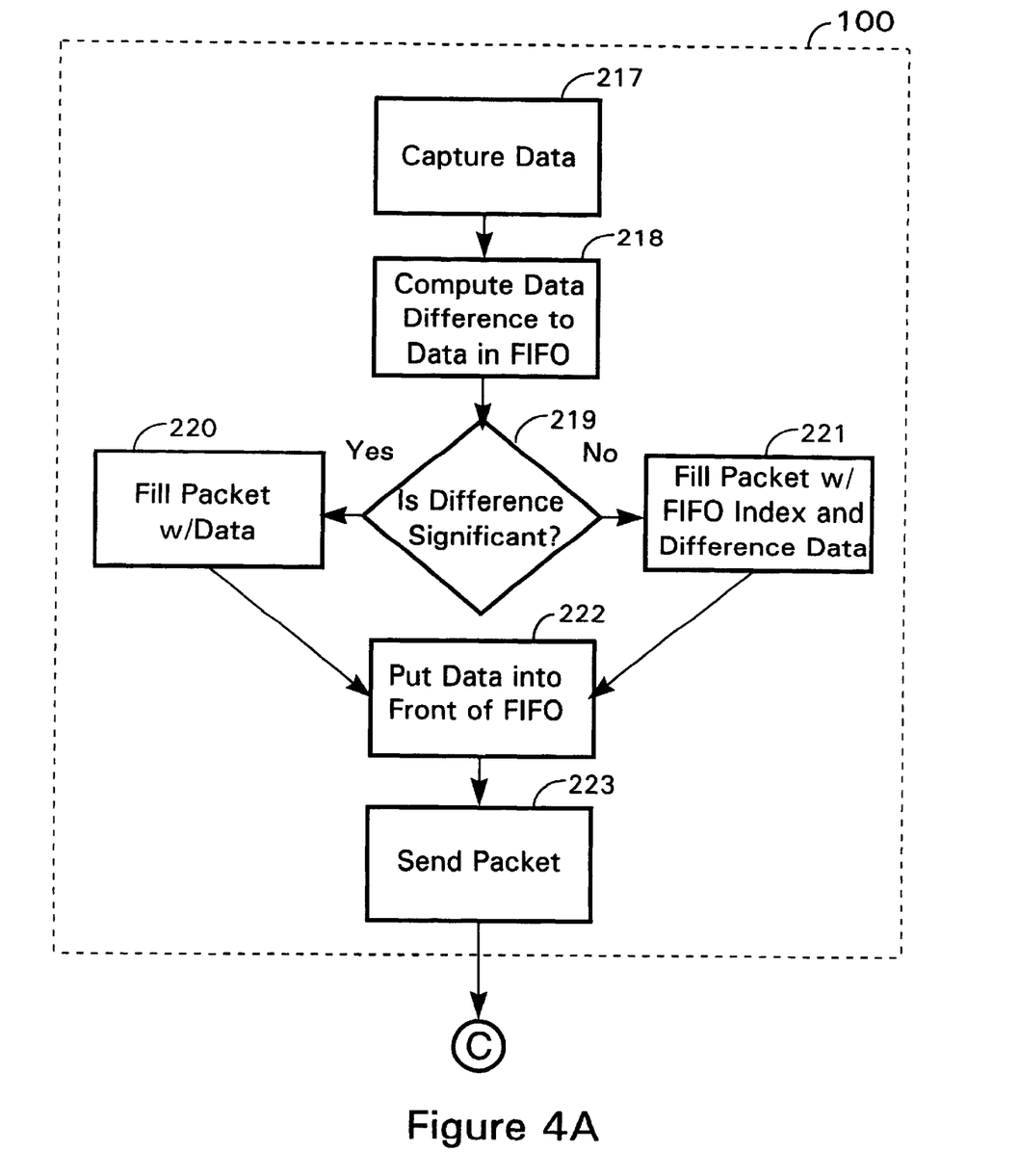
FIGS. 4A–B are related flow charts of functional steps for performing traffic reduction according to an alternate more generalized embodiment of the present invention.
Figure 4B:
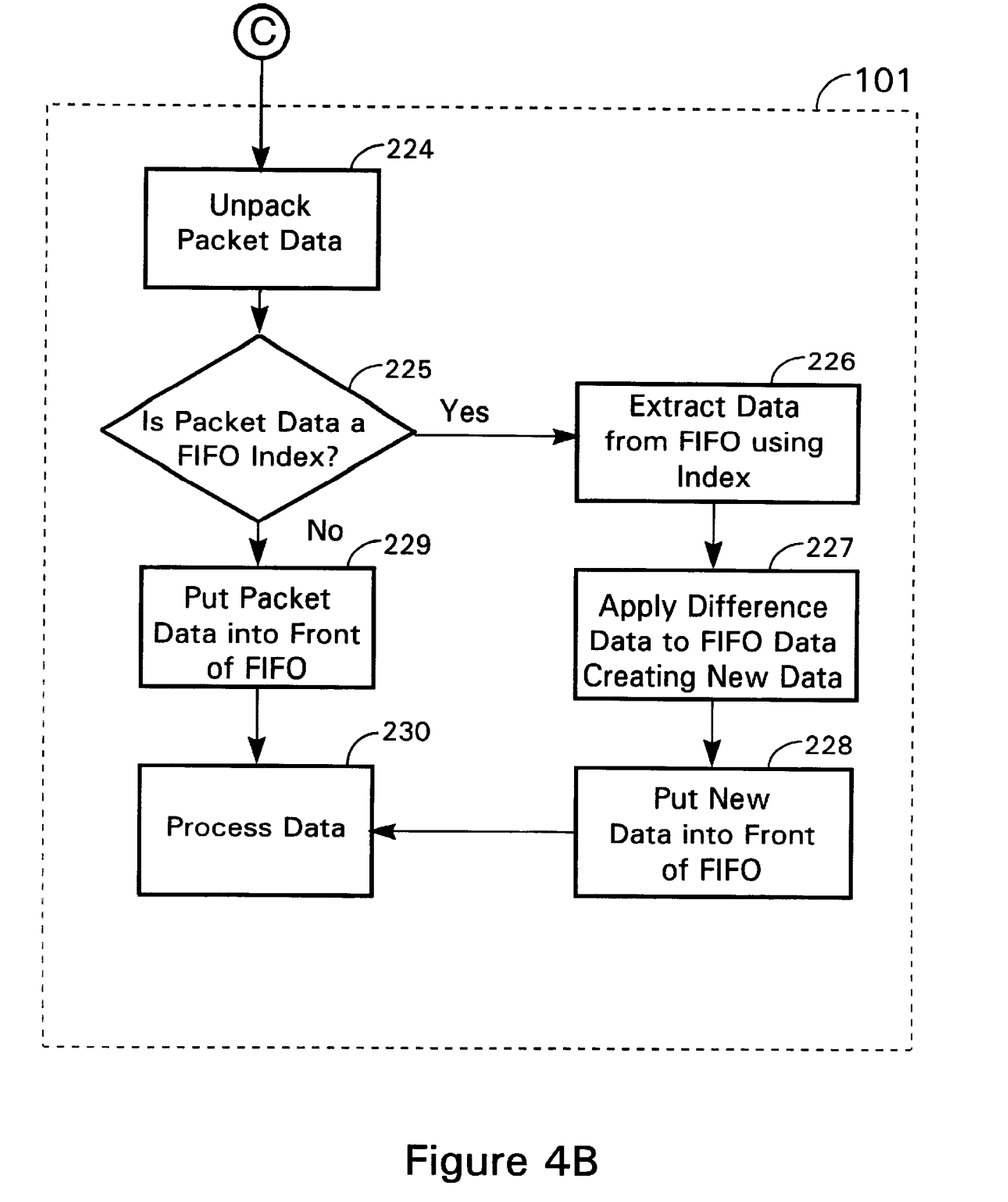

FIGS. 4A–B are related flow charts of functional steps for performing traffic reduction according to more generalized embodiment of the present invention. Initially, in FIG. 4A, data is captured 217 as before. However, in this case, software or firmware in processor 100 computes 218 a difference between captured data and corresponding data in FIFO. Processor 100 determines 219 whether the difference is significant, preferably according to preselected tuning parameters. Note that when such difference is or approaches zero, this embodiment becomes more similar to prior embodiments described above. If processor 100 decides YES in step 219, that significant data difference, then packet is filled 220 with data. Otherwise, if processor 100 decides NO in step 219, that insignificant data difference, then packet is filled 221 with FIFO index and difference data. Packet processing performance is improved by flushing from FIFO non-relevant data before relevant data; note that steps 221, 222 are accordingly related. Then, packet is sent 223 by processor 100 to processor 101 over network [C].

In related FIG. 4B, transmitted packet is received from network [C], and unpacked 224 as before by processor 101 to obtain data content. Preferably, software or firmware in processor 101 determines 225 whether unpacked packet data is a FIFO index by checking typed instruction (or comparing against local corresponding FIFO). If processor 101 decides NO in step 225, that packet data is not a FIFO index, then such data is put 229 into front of FIFO. Otherwise, if processor 101 decides YES in step 225, that packet data is a FIFO index, then desired data is extracted 226 from FIFO correspondingly according to the index, and difference data is applied 227 to FIFO data to create new data, which is put 228 into front of FIFO. During processing by processor 101 during path between steps 227, 228, packet processing performance is improved by flushing from FIFO non-relevant data before relevant data; note that steps 227, 228 are accordingly related. Then, as before, data is processed 230 by processor 101.

To explain steps in FIGS. 4A–B, sample packet for handle-to-device-context (hdc) instruction follows, having old-packet data which is not significantly different:

| Instruction format: | TextOut (hdc, x, y, string, length); |
| Sample instruction: | TextOut (0xCAFEBABE, 10, 10, "Hello", 5); |
| Packet: (4 bytes) | TextOut Command |
| (4 bytes) | 0xABCDABCD |
| (4 bytes) | 10 |
| (4 bytes) | 10 |
| (6 bytes) | "Hello" |
| (4 bytes) | 5 |

The above modified packet is composed of 26 bytes. Referring to FIG. 4A, during subsequent processing (i.e., repeat transmission of recently sent packet) of this instruction by processor 100, data difference is computed 218 and determined 219 not to be significantly different according to user-specified tuning parameters. Packet is filled 221 with FIFO index and difference data, and such data is put 222 into front of FIFO. Regarding packet "0xCAFEBABE", compression is obtained the first time around, since similar, but different, packet "0xABCDABCD" was sent previously; hence, it is not necessary to wait until repeat transmission to get desired effect. In this case, packet for sending 223 is still shorter (12 bytes total) than original full packet as follows:

| Packet: (4 bytes) | Use FIFO (DIFF) command |
| (4 bytes) | 5 |
| (4 bytes) | 0xCAFEBABE |

Referring to FIG. 4B, during subsequent processing of the 12-byte packet, step 225 FIFO index determination causes extraction 226 of entire 26-byte packet from FIFO according to the index #5, and difference data is applied 227 to FIFO data to create new data, which is put 228 into front of FIFO for processing 230 of the reconstructed original 26-byte packet.

What is claimed is:

1. In a networked computer system having a first source processor coupled to a second destination processor, a method for processor communication comprising the steps of:

a first source processor sending an unrequested first instruction to a second processor;

the second destination processor monitoring and executing the first instruction;

the first source processor sending an unrequested second instruction representing the first instruction to the second destination processor, wherein the second instruction comprises an unaltered instruction or a short instruction depending on a difference determined by the first source processor by comparing the first instruction against data provided in a locally-accessible storage, the first instruction being sent by the first source processor to the second destination processor effectively on a non-repetitive basis; and the second destination processor monitoring and executing the first instruction.

2. The method of claim 1 further comprising the step of:

storing the first instruction by the first source processor, wherein the first instruction is identifiable as a recently-used instruction.

3. The method of claim 2 wherein:

storing by the first source processor is optimized according to an instruction type of the first instruction, wherein storage optimization is distinguishable between text or graphics-type instructions, thereby enabling dynamic storage tuning.

4. The method of claim 3 wherein:

storage optimization is dynamically adaptable by the first source processor according to a user-specified change of instruction type.

5. The method of claim 2 wherein:

the same first instruction is stored and maintained synchronously in a first memory of the first source processor and a second memory of the second destination processor.

6. The method of claim 2 further comprising the step of:

after the first source processor sends the second instruction, the second destination processor recognizing the second instruction as corresponding to the stored first instruction.

7. The method of claim 6 wherein:

each instruction sent between the first source and second destination processors includes an identifiable index generated by the first source processor.

8. The method of claim 1 wherein:

the first instruction comprises a first instruction set, and the second instruction comprises a second instruction set, such that the first source processor sends the first instruction set to the second destination processor, the second destination processor executes the first instruction set, the first source processor sends the second instruction set representing the first instruction set to the second destination processor, and the second destination processor executing the first instruction set, wherein the second instruction set comprises one or more unaltered instructions or short instructions depending on a difference determined by the first source processor by comparing one or more instructions in the first instruction set against data provided in a locally-accessible storage.

9. The method of claim 8 wherein:

the second instruction set represents a sub-set of the first instruction set, such that the second destination processor executes the sub-set of the first instruction set, wherein the second destination processor executes such sub-set according to the type of instructions in such sub-set.

10. A networked computer system comprising:

a server and client coupled thereto;

wherein the server sends to the client an instruction set for execution by the client, the server sends to the client a short instruction representing the instruction set depending on a difference determined by the server by comparing a type of the instruction set against one or more instruction types stored in a cache allocated to the server, such that the client re-executes the instruction set according to a corresponding short instruction, the instruction set being sent by the server to the client effectively on a non-repetitive basis.

11. In a networked computer system comprising coupled processors, a memory management method for improving inter-processor instruction traffic comprising the steps of:

storing in a system memory associated with a first processor an indexed representation of at least one instruction recently transmitted unsolicitedly between a plurality of processors;

monitoring communication processing by the first processor to tune dynamically the system memory according to a type of each such represented instruction, and capture and compare with the system memory one or more instruction packets pushed between the processors to detect attempt to retransmit a recently-transmitted instruction as representatively stored in the system memory; and causing re-execution by one of the processors of the represented recently-transmitted instruction, the recently-transmitted instruction being sent between the processors effectively on a non-repetitive basis.

12. In a networked computer system having a first processor coupled to a second processor and a First-In-First-Out (FIFO) memory, a method for processor communication comprising the steps of:

a first processor non-responsively sending a first packet to a second processor coupled thereto in a network, the first packet being stored as a recently-used instruction in a FIFO memory separately accessible by the first processor;

the second processor receiving the first packet non-requestedly, the first packet being sent by the first processor to the second processor effectively on a non-repetitive basis;

the first processor processing a second instruction by comparing the second instruction to the recently-used instruction to determine a difference according to a specified amount;

the first processor non-responsively providing a second packet including the second instruction if the difference is determined, or the first processor non-responsively providing the second packet to include an identifiable index and a difference data if the difference is not determined;

the first processor non-responsively sending the second packet to the second processor; and the second processor receiving the second packet non-requestedly.

13. The method of claim 12 further comprising the step of:

the second processor determining whether the second packet includes the identifiable index, the second processor processing the second instruction if the second processor determines that the second packet does not include the identifiable index, the second processor generating a new data if the second processor determines that the second packet includes the identifiable index, the new data being provided in the FIFO and an other FIFO separately accessible by the second processor.

14. The method of claim 13 wherein:

the second processor generates the new data according to the difference data and the recently-used instruction, the new data being processed by the second processor, the new data being provided by the second processor in the FIFO and the other FIFO.

* * * * *